United States Patent
Adolpho

(10) Patent No.: US 9,481,429 B2
(45) Date of Patent: Nov. 1, 2016

(54) BOARD HANGER

(71) Applicant: Thomas Adolpho, Hauula, HI (US)

(72) Inventor: Thomas Adolpho, Hauula, HI (US)

(*) Notice: Subject to any disclaimer, the term of this patent is extended or adjusted under 35 U.S.C. 154(b) by 0 days.

(21) Appl. No.: 14/704,704

(22) Filed: May 5, 2015

(65) Prior Publication Data

US 2015/0314838 A1 Nov. 5, 2015

Related U.S. Application Data

(60) Provisional application No. 61/988,310, filed on May 5, 2014.

(51) Int. Cl.
| | | |
|---|---|---|
| *A45F 3/14* | (2006.01) | |
| *B63B 35/79* | (2006.01) | |
| *F16B 2/08* | (2006.01) | |
| *F16M 13/02* | (2006.01) | |

(52) U.S. Cl.
CPC ............. *B63B 35/7946* (2013.01); *F16B 2/08* (2013.01); *F16M 13/02* (2013.01)

(58) Field of Classification Search
CPC .................... B63B 35/7946; A45F 2003/142; A45F 3/14; A45F 3/15; Y10S 224/917
See application file for complete search history.

(56) References Cited

U.S. PATENT DOCUMENTS

| | | | | |
|---|---|---|---|---|
| 4,878,585 A | * | 11/1989 | Orestano | A47F 7/0028 211/87.01 |
| 4,903,875 A | * | 2/1990 | Smart | A63C 11/025 224/149 |
| 5,014,955 A | * | 5/1991 | Thompson | B63B 35/7946 206/583 |
| 5,107,995 A | * | 4/1992 | Simpson | A47F 5/0006 211/60.1 |
| 9,114,270 B2 | * | 8/2015 | Aldridge | A61H 1/0237 |
| 2009/0001034 A1 | * | 1/2009 | Hazan | B63B 35/7946 211/85.7 |
| 2013/0043291 A1 | * | 2/2013 | Davis, Jr. | A45F 3/14 224/578 |

* cited by examiner

*Primary Examiner* — Rodney Mintz
*Assistant Examiner* — Daniel Kenny
(74) *Attorney, Agent, or Firm* — Hawaii Patent Services; Nathaniel K. Fedde

(57) ABSTRACT

The present invention provides a hanger configured to support a sports board (e.g. surfboard), for example, in a vertical orientation. The hanger comprises a mount configured for attachment to a supportive structure (e.g. a wall mount) and a ring configured to surround and contact the body of the sports board ('body ring') such that at least a portion of the weight of the board is supported by friction imparted by the body ring on the sports board. Embodiments of the present invention provide an efficient and aesthetic mechanism for hanging a sports board such as a surfboard.

23 Claims, 17 Drawing Sheets

BOARD HANGER

CROSS-REFERENCE TO RELATED APPLICATIONS

This application claims the benefit of U.S. Provisional Patent Application No. 61/988,310, filed 5 May 2014.

TECHNICAL FIELD

The present invention relates to sports board hangers such as surfboard hangers.

BACKGROUND

The storage of surfboards can present problems due to their large size and awkward shape. Furthermore, surfers often take great pride in presenting these delicate works of art for others to admire share stories about the waves they surfed with each surfboard. While careful handling of surfboards can reduce damage, the easily-damaged materials used in the construction of many surfboards can present quite a burden to successful storage.

Horizontal wall mounts have long been used to successfully store surfboards. These horizontal mounts essentially present a surfboard in an orientation similar to that seen when the board is in use. However, attempts at vertical storage have been met with limited success.

U.S. Pat. No. 4,878,585 (Orestano) describes a T-harness for storing a surfboard having a nose-stirrup serving to support the vertical load and T-straps that wrap around the mid-body region to keep the surfboard in an upright position.

U.S. Pat. No. 5,107,995 (Simpson) describes a strap for holding a surfboard. The strap has a pocket that holds the nose to support the weight of the surfboard and has a slit that surround a fin of the surfboard to keep the surfboard board in an upright position but sitting upside down with the top facing the wall.

U.S. Pat. No. 5,014,955 (Thompson) describes a surfboard holder comprising a lower enclosure for insertion of the nose of a surfboard and an upper enclosure for insertion of the tail of a surfboard; and a stretchable cord member extending from the upper enclosure to the lower enclosure. The lower enclosure supports weight of the surfboard while the upper enclosure keeps the surfboard in an upright position but sitting upside down with the top facing the wall.

Each of the above-cited references provides a hanger with a single weight-bearing surfboard contact point. None of the above-cited references teach a vertical hanger comprising a plurality of surfboard attachments points configured to distribute the weight of a surfboard among different portions of the surfboard. Further, none of the above-cited references teach a hanger with a body ring configured to support the weight of a surfboard vertically by a frictional force alone or in combination with a second attachment point such as an end seat configured to support the weight of a surfboard by a normal force. Further, none of the above-cited references teach a hanger that attaches to an existing leash plug to support the weight of the surfboard. Further, none of the above-cited references teach a hanger that displays a surfboard in a vertical orientation and presents the surfboard top side for aesthetic viewing. Embodiments of the present invention overcome one or more of these deficits.

What is needed in the art is a hanger that supports a surfboard in a vertical orientation without damaging to the board and provides an efficient and aesthetic mechanism for installation on a surfboard. Embodiments of the present invention provide such a hanger.

SUMMARY OF THE INVENTION

The present invention provides a hanger configured to support a sports board (e.g. surfboard), for example, in a vertical orientation. The hanger comprises a mount configured for attachment to a supportive structure (e.g. a wall mount) and a ring configured to surround and contact the body of the sports board ('body ring') such that at least a portion of the weight of the board is supported by friction imparted by the body ring on the sports board. Optionally, the hanger further comprises a second board attachment point (e.g. an end seat or a second body ring) configured to support at least a portion of the weight of the board at a second portion of the board. Optionally, the hanger further comprises a strap (e.g. vertical strap) connecting the second board attachment point to the body ring. Optionally, the strap and the mount are connected to opposing portions of the body ring.

In one embodiment, the invention provides a sports board (e.g. surfboard) hanger comprising:
  a. an end seat configured to support an end of a sports board;
  b. a ring configured to surround and contact the body of the sports board ('body ring'), wherein the body ring is connected to the end seat;
  c. a wall mount connected to the body ring, wherein, the wall mount and the end seat are connected to opposing portions of the body ring; and
  d. optionally, a first strap connected at one end to the end seat and at another end to the body loop ('lower strap').

Optionally, the hanger further comprises a strap providing connection of the mount to the body ring ('upper strap'). The upper strap can be connected at one end to the wall mount and at another end to the body ring. Alternatively, the wall mount is optionally directly attached to the body ring.

Optionally, the hanger comprises a lower strap and/or an upper strap that is vertically oriented ('vertical strap').

Optionally, the end seat is a tail seat. Optionally, the tail seat comprises a tail pocket, a tail loop, a fin seat, or a plug seat. Optionally, the plug seat comprises a hook.

Optionally, the body ring is adjustable. Optionally, said adjustability of the body ring is provided by one or more hook and loop mechanisms Optionally, the body ring comprises two interacting straps that collectively form the body ring. Optionally, one or both of the two interacting straps are adjustable (e.g. by a hook and loop mechanism). Optionally, each of the of the two interacting straps have a hook a loop mechanism, wherein the hook and loop mechanism comprises a section of hoop on a first portion of the strap and a section of loop on a second portion of the strap, optionally wherein the first portion and the second portion are adjacent to each other.

Optionally, the lower strap has an adjustable length. Optionally, the adjustability of the lower strap is provided by a hook and loop mechanism, e.g. wherein the hook and loop mechanism comprises a section of hoop on a first portion of the lower strap and a section of loop on a second portion of the lower strap, optionally wherein the first portion of the lower strap and the second portion of the lower strap are adjacent to each other.

Optionally, the upper strap has an adjustable length. Optionally the adjustability of the upper strap is provided by a hook and loop mechanism, e.g. wherein the hook and loop mechanism comprises a section of hoop on a first portion of the upper strap and a section of loop on a second portion of the upper strap, optionally wherein the first portion of the upper strap and the second portion of the upper strap are adjacent to each other.

Optionally, when the hanger is installed on a surfboard and mounted to a wall, the weight of the surfboard on the lower strap causes the body ring to apply lateral force to ('squeeze') the surfboard. Optionally, the amount of lateral force applied to the surfboard by the body ring is dependent upon the weight of the surfboard.

Optionally, the weight of the sports board (e.g. surfboard) is at least partially supported by friction imparted on the surfboard by the body ring. Optionally a portion of the weight of the surfboard is supported by a first force imparted on the surfboard by the body ring and a portion of the weight of the surfboard is supported by a second force imparted by a second board attachment point (e.g. a second body ring or an end seat), wherein the first force is a frictional force and the second force is a normal force (e.g. provided by an end seat such as a hook) or a frictional force (e.g. provided by a second body ring).

Optionally, when the hanger is installed on a surfboard and mounted, the body ring forms a "V" shape, e.g. symmetrically positioned over the center line of the surfboard. Optionally, the hanger comprises an upper strap and/or a lower strap and, when the hanger is installed on a surfboard and mounted, the body ring forms a "Y" shape in combination with at least one of the lower strap and the upper strap. Optionally, the "Y" shape is symmetrically positioned over the center line of the surfboard.

Optionally, the body ring is coupled to the lower strap and/or the optional upper strap by a connector ring (e.g. rigid ring). Optionally, the connector ring is multisided (e.g. triangular ring) or has at least one curved portion (e.g. a circular ring, a D-link ring).

Optionally, the wall mount comprises a connector ring (e.g. rigid ring) such as a circular ring (e.g. a grommet), a triangular ring, or a D-link ring.

Optionally the components of a hanger of the invention (e.g. body ring, mount, end seat, optional upper strap, and optional lower strap) are permanently connected to each other (e.g. sewn or molded together or formed as a single continuous member) or releasably connected to each other (e.g. by releasable attachments such as, e.g. hook and loop mechanisms, buttons, clasps, ties or buckles).

DETAILED DESCRIPTION OF THE INVENTION

Figure 1:
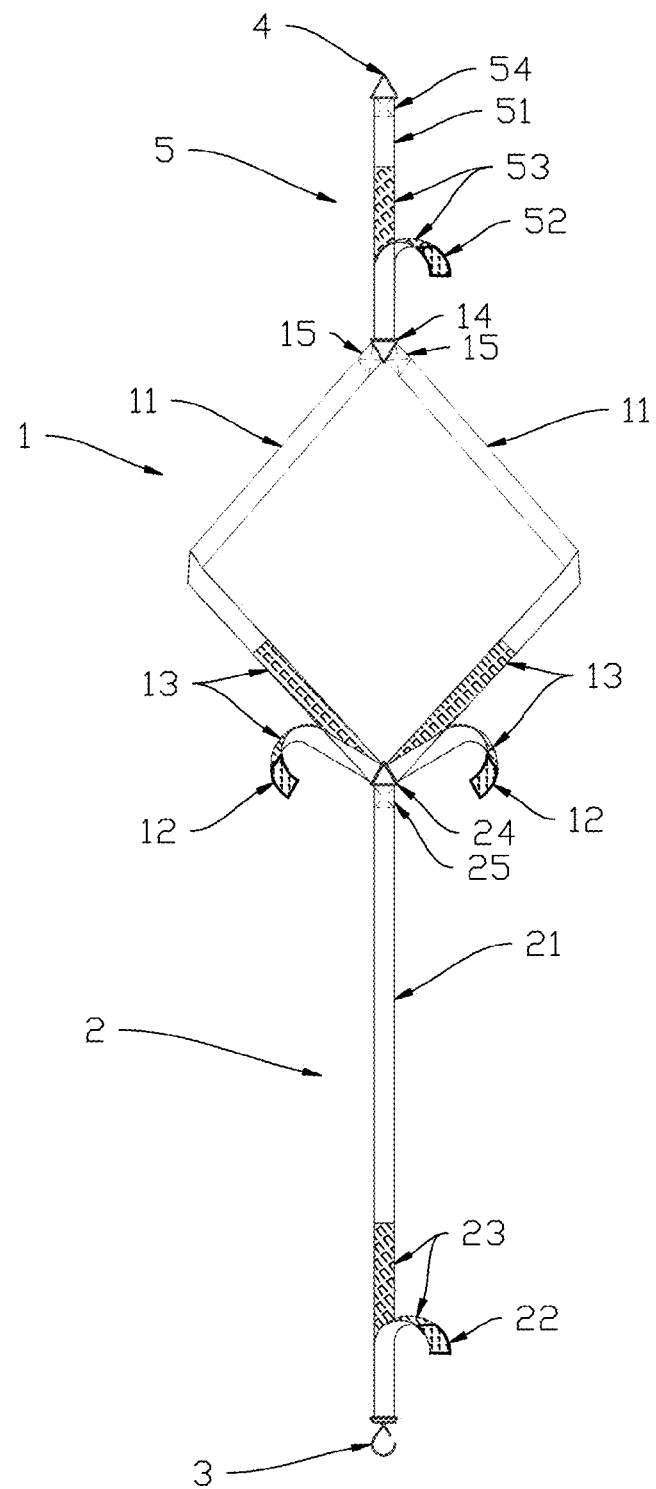
FIG. 1 depicts a hanger of the invention.

As used here, the following definitions and abbreviations apply.

"Hook and loop mechanism" means a mechanism comprising a plurality of hooks and a plurality of loops that interlock to form a coupler. Optionally, the plurality of hooks are provided on a first section a strap and the plurality of loops are provided on a second section of the same strap, such that the strap can be folded back on itself to interlock the hooks with the loops. Optionally, the hooks and straps are non-rigid. An example of a hook and loop mechanism is Velcro®.

Mount

In one embodiment, a hanger of the present invention comprises a mount. The mount can be any device configured to attach the body ring to a supporting structure and bear the weight of the board when the hanger is installed with the board. The supporting structure can be any structure, e.g. a wall, a ceiling, a stand, or any device fixed thereto such as a screw, nail, hook, or other fastener.

The mount can be connected to the body ring in any manner. For example, the mount can be connected directly to the body ring or can be connected to a strap (e.g. upper strap) that is in-turn connected to the body ring.

Optionally, the hanger comprises an upper strap providing connection of the mount to the body ring, wherein the length of the upper strap is less than a length which, when the hanger is installed on a sports board and the end seat is connected to a first end (e.g. tail) of the sports board, extends from the body ring past a second end (e.g. nose) of the sports board which opposes the first end. Such a configuration with a short upper strap (or no upper strap) allows the upper strap to be hidden behind the sports board and, for example, showing only a "Y", on the viewable surface of the sports board when mounted to a supportive structure.

The mount can be made of any material, e.g. metal, plastic, rubber, natural or non-natural materials, or rope.

Optionally, the mount is configured for attaching to a projection (e.g. screw, nail, or hook) of a supporting structure. Optionally, the mount is a hook or a ring.

In one embodiment, the mount is a ring ("mounting ring").

Optionally, the ring is rigid (e.g. metal ring or rigid D-ring) or flexible (e.g. a self-intersecting rope such as a rope tied in a circle or any flaccid ring such as a non-reinforced hole in a flaccid strap).

Optionally, the ring is an external ring (i.e. a mounting ring attached to and extending from another component such as a strap) or an internal ring such as a hole in another component (e.g. a hole in a strap) or a grommet in another component (e.g. an eyelet such as a plastic, rubber, or metal eyelet that lines a hole in another component such as a strap).

Optionally, the mount is a wall mount. The wall mount can be any mount configured to attach the hanger to the wall or projection or other attachment point thereof. Optionally, the wall mount is configured to bear the weight of a surfboard installed in the hanger and allow the surfboard to hang in a vertical orientation along the wall.

In one embodiment, the mount is a hook, e.g. a rigid hook such as a metal hook or rigid plastic hook.

Straps

A hanger of the invention comprises one or more straps that are connected to the mount and a surfboard to hang and bear the weight of a surfboard when installed with the hanger.

A hanger of the invention can comprise a body ring, a lower strap, and optionally, an upper strap.

Optionally, one or more of the straps (e.g. body ring, lower strap, and/or upper strap) are adjustable, i.e. have adjustable lengths. Any adjustable strap can have any length-adjustment mechanism, e.g. a hook and loop mechanism or a buckle such as a cam buckle, a tongue buckle, or a bar slide (e.g. a ladderloc or a three bar slide such as a triglide). Optionally, said adjustability of the one or more straps is provided by one or more hook and loop mechanisms, e.g. a hook and loop mechanism such as Velcro®. For example, a strap can be made adjustable by providing an end of the strap with a section of loop and a section of hook (e.g. wherein the sections are adjacent to each other) such that the end of the strap can be folded upon itself and fixed (i.e. attaching the section of loop to the section of hook). As an alternative to a hook and loop mechanism, any other attachment mechanism can be used and configured to allow adjustment of strap length. Such an adjustable strap is also referred to herein as a 'self-folded strap'

Optionally, a hanger of the invention comprises a plurality of straps. Optionally, the hanger comprises two or more straps that are reversibly coupled to each other (i.e. can be disconnected from each other). Any coupler is useful for reversibly coupling straps together. For example, the ends of the straps can comprise interacting members (e.g. a plug/jack configuration with a plug on one strap and a jack on the other strap), or the ends of the straps can each be coupled to a shared device (e.g. the end of the each strap can be coupled to a shared ring such as a D-link ring), wherein at least one of the straps can be disconnected from the shared device. For example, a hook and loop mechanism can be used to attach straps together, or to attach a strap to a shared device. Other mechanisms for coupling straps together include buttons and slots, clamps, and rings.

The one or more straps can be made of any material, which may be the same or different as other straps of the hanger. Useful materials include both natural materials and synthetic materials. Examples of natural materials include natural rope (e.g. made from hemp, manila, sisal, coir, or flax), rubber, or cotton. Examples of synthetic materials include polymers such as thermoplastic resins, which can be constructed in a woven or non-woven form. Optionally, the body ring is made from any synthetic polymer selected from a polyamides (e.g. nylon), a polyethylene terephthalate (PET), a polyolefin, a polyalkylene, a polypropylenes (PP), a polyethylene (LDPE), a PolyVinyl Chloride (PVC), a vinylidene chloride (e.g. PVDC), a Polychlorotrifluoroethylene (PCTFE), or a vinyl.

Optionally, one or more straps comprised by the invention (e.g. body strap, lower strap, and/or upper strap) are substantially non-elastic. Optionally, when a tensile force of 200 newtons is applied to the strap, a substantially non-elastic strap stretches by less than 30%, 20%, 15%, 10%, 5%, or 2%.

Optionally, one or more straps comprised by the invention (e.g. body strap, lower strap, and/or upper strap) are substantially non-elastic and are also flexible or flaccid.

Optionally, one or more straps comprised by the invention (e.g. body strap, lower strap, and/or upper strap) have a substantially planar face. For example, the strap(s) can optionally have a planar face with a width of at least 0.25 inches, at least 0.5 inches, or at least 1 inch (e.g. and have a length configured for the size of the board). Such a strap can be used, e.g. to increase surface area contact between the strap and the board, e.g. to increase friction and/or stabilizing force. Alternatively, one or more straps comprised by the invention optionally have a curve in contact with the board (e.g. a cylindrical rope used as a strap).

Body Ring

A hanger of the present invention comprises a body ring. The body ring can be any device that that surrounds the body of a surfboard and bears at least a portion of the weight of a surfboard installed in the hanger. Optionally, such that at least a portion of the weight of the board is supported by friction imparted by the body ring on the board.

The body ring can be made from any material.

Optionally, the body ring comprises one or more straps. Optionally the hanger comprises a lower strap and/or an upper strap and the one or more straps of the body ring are made from the same material as one or both of the lower strap and the upper strap. The one or more body ring straps are optionally made from any natural material or synthetic material taught herein (e.g. nylon) and are optionally constructed in woven or non-woven form.

Optionally, the body ring is flexible. Optionally, the body ring is conformable, i.e. conforms to the surface of the surfboard.

Optionally, the body ring is adjustable. Optionally, said adjustability of the body ring is provided by one or more hook and loop mechanisms, e.g. a hook and loop mechanism such as Velcro®.

Optionally, the body ring comprises one or more members reversibly coupled to form the body ring. For example, the body ring can comprise a single strap having a first end and a second end, wherein the first end and the second end are configured to be coupled together to form the body ring. As another example, the body ring can comprise a plurality of straps, wherein the ends of the straps are coupled together to form the body ring, and wherein an end of a first strap is reversibly coupled to an end of a second strap. The ends of straps can be reversibly coupled with any mechanism ('reversible coupler'). For example, the ends of the straps can comprise interacting members (e.g. a plug/jack configuration with a plug on one strap and a jack on the other strap), or the ends of the straps can each be coupled to a shared device (e.g. the end of the each strap can be coupled to a shared ring such as a triangular ring or D-link ring). Optionally, one or both of the first end and a second end have adjustable lengths (e.g. a hook and loop mechanism provided at the first end and/or second end). Optionally, each hook and loop mechanism comprises a section of hoop on a first portion of the respective strap and a section of loop on a second portion of the respective strap, optionally wherein the first portion and the second portion are adjacent to each other.

Optionally, the body ring comprises at least two interacting straps that collectively form the body ring. Optionally, a first strap of the at least two interacting straps comprises a first end and a second end, a second strap of the at least two interacting straps compresses first end and a second end, wherein the first end of the first strap is coupled to the first end of the second strap, and the second end of the first strap is connected to the second end of the second strap. Optionally, the ends are coupled directly to each other or are coupled to a common member such as a ring (e.g. a triangular ring or D-link ring). Optionally, the two interacting straps are reversibly coupled at respective ends to form the body ring. Optionally, one or both of the two interacting straps are adjustable (e.g. by a hook and loop mechanism). Optionally, each of the of the two interacting straps have a hook a loop mechanism, wherein the hook and loop mechanism comprises a section of hoop on a first portion of the strap and a section of loop on a second portion of the strap, optionally wherein the first portion and the second portion are adjacent to each other.

Optionally, the body ring is coupled to the lower strap and/or the optional upper strap by a connector ring (e.g. rigid ring such as a metal triangular ring or D-link ring). Optionally, the connector ring has at least one curved portion (e.g. a circular ring or a D-link ring).

Optionally, the body ring is coupled to a lower strap at a first coupler (e.g. ring such as a triangular ring or D-link ring) which connects lower ends of the body ring straps. Additionally or alternatively, the body ring is optionally coupled to an upper strap at a second coupler which connects upper ends of the body ring straps. For example, the first coupler and/or second coupler can be a ring fixed (e.g. removably fixed such as by a hook and loop mechanism or non-removably fixed such as sewn) to the respective upper strap or lower strap. Optionally, when the hanger is installed on a surfboard, the first coupler and/or the second coupler are positioned about the center line of the surfboard.

Optionally, when the hanger is installed on a surfboard and mounted, the body ring forms a "Y" shape in combination with at least one of a lower strap and an upper strap. Optionally, the "Y" shape is symmetrically positioned about the center line of the surfboard. Such a "Y" shape can be formed, e.g. from pulling action on the body ring from the upper strap and/or the lower strap due to the weight of the surfboard.

Optionally, the end seat and the mount are connected to opposing portions of the body ring (e.g. such that, when installed, one portion is behind the board and the other portion is in front of the board). Such a hanger can be configured in any manner such that, when the hanger is installed on a surfboard and mounted to a wall, the weight of the surfboard on the body ring (and lower strap, if used) causes the body ring to apply lateral force to ('squeeze') the surfboard. For example, the amount of lateral force applied to the surfboard by the body ring can be dependent upon the weight of the surfboard. This features is surprisingly useful, e.g. because greater lateral force, and hence greater weight-bearing friction, will be applied to a heavier surfboard. This features is especially useful, e.g. to reduce the amount of force applied by an end seat to the surfboard, thereby reducing damage such as compression marks ("dings") or cracks to the delicate surfboard end. This configuration also pulls the body ring snug conforming to the shape of the surfboard or other sports board, preventing movement side to side relative to the hanger. It also reduces the movement of the surfboard on the wall. This stabilizes the surfboard to present the surface of the board in an aesthetic orientation for viewing.

The body ring can have any length that surrounds a sports board. Optionally, the body ring is configured to surround a surfboard, e.g. a short board, a fun board, a long board, or a SUP. For example, a body ring configured to surround a surfboard optionally has a length of about 30 inches to about 100 inches, about 40 inches to about 60 inches, or about 40 inches to about 52 inches. As one non-limiting example, the body ring (e.g. with a fixed length or adjustable length) can be about 48 inches which will fit most surfboards and provide a squeeze on the board when under tension from the weight of the board on the end seat.

Lower Strap

A hanger of the present invention optionally comprises a lower strap. The lower strap connects the body ring to the end seat.

The lower strap can be connected to the body ring with any mechanism. Further, the connection to the body ring can be direct or indirect. For example, lower strap and body ring can be attached directly to each other or can each attach to a shared device (e.g. a ring such as a triangular ring or D-link ring).

The lower strap can be connected to the end seat with any mechanism. Further, the connection to the body ring can be direct or indirect. As one example, the lower strap can be coupled to an end seat by a hook and loop mechanism.

Optionally, the lower strap is connected to an opposing side of the body ring relative to the mount. As discussed herein, this feature advantageously induces the body ring to tighten around the surfboard body when a weight (e.g. weight of an installed surfboard) is applied to the lower strap.

Optionally, the lower strap is an adjustable strap. Optionally, the lower strap is an adjustable strap. The adjustable strap can have any length-adjustment mechanism, e.g. a hook and loop mechanism or a buckle such as a cam buckle, a tongue buckle, or a bar slide (e.g. a ladderloc or a three bar slide such as a triglide). Optionally the lower strap is looped through an end seat and connected to itself via the length-adjustment mechanism.

Figure 2A:
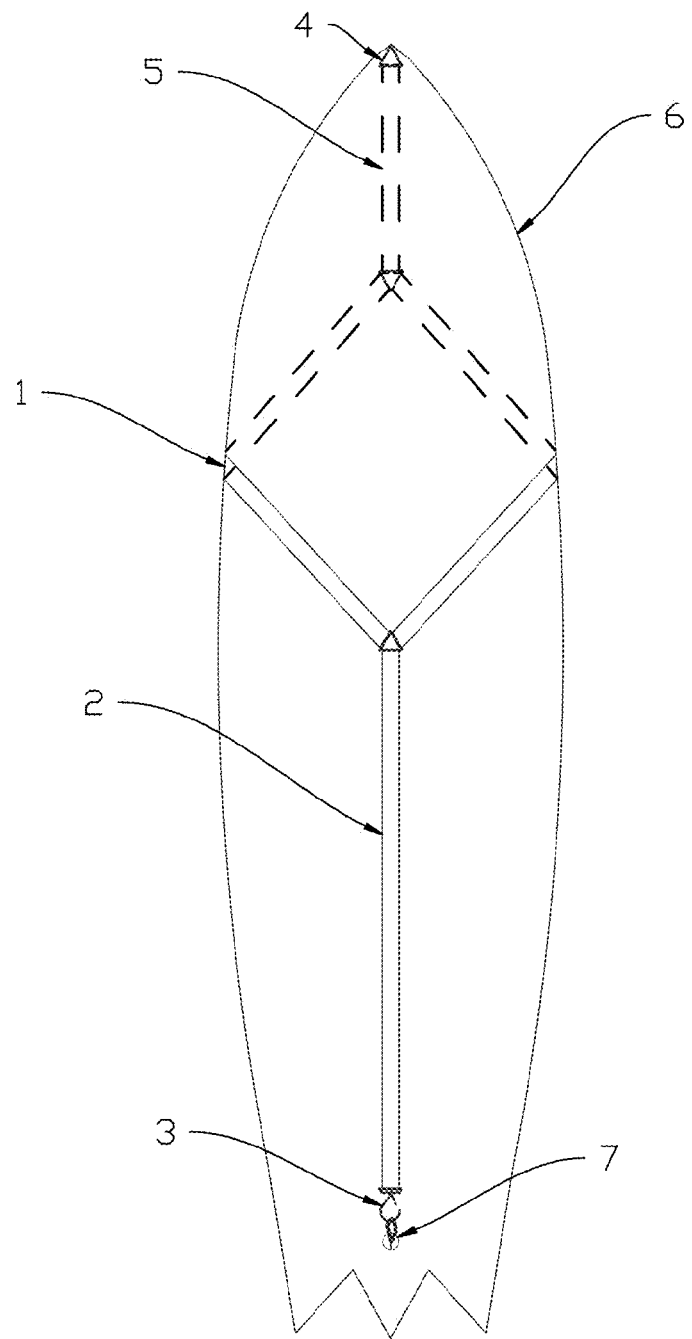
FIGS. 2A-2C depict a hanger of the invention installed on a surfboard in a front view, side view, and perspective view, respectively.

According the present invention, a lower strap can optionally provide one or more advantages. For example, the lower strap can be used to connect the body ring to the end seat such that the body ring can be located higher on the board, thus preventing the board from falling forward and out of the body ring. For example, while the invention contemplates a hanger without a lower strap, as in FIG. 9, a sufficient forward force on the top of the board would cause the board to fall forward out of the body ring, e.g. when a lighter board does not exert enough tension on the body ring to prevent such. However, the incorporation of a lower strap, as shown in FIG. 2A, raises the body ring to a higher level and prevents such an occurrence. The use of a lower strap also allows the manufacturer (or user in the case of an adjustable lower strap) to choose the exact height of the body ring for fall prevention (as described above) or for aesthetic appeal.

Upper Strap

A hanger of the present invention optionally comprises an upper strap. The upper strap can be configured in any manner that connects the body ring to the mount.

The upper strap can be connected to the body ring with any mechanism. Further, the connection to the body ring can be direct or indirect. For example, upper strap and body ring can be attached directly to each other or can each attach to a shared device (e.g. a ring such as a triangular ring D-link ring).

The upper strap can be connected to the mount with any mechanism. Further, the connection to the body ring can be direct or indirect. As one example, the upper strap can be coupled to the mount by providing the mount as a ring mount, inserting the upper strap through the ring mount, folding the upper strap back in itself and sewing, gluing, riveting, or otherwise attaching the upper strap to itself.

Optionally, the upper strap is an adjustable strap.

Optionally, the upper strap is releasably connected to the body ring.

Optionally, the upper strap is long enough such that the upper strap extends from the body ring past a second end (e.g. nose) of the sports board which opposes the first end (e.g. the tail). In such an embodiment, a sports board such as a surfboard can optionally be hung from a supportive structure (e.g. wall) with the bottom side optionally facing out towards a viewer and with the top side facing away from the viewer (e.g. towards the wall or other supportive structure), wherein the lower portion of the body ring optionally faces the away from the viewer and both the upper portion of the body ring and the upper strap optionally face towards the viewer, and wherein the upper strap is long enough such that it extends past the second end of the sports board to interface the mount to the supportive structure (e.g. where the viewer sees the hanger as an upside down "Y"). An optional alternative to this embodiment is a hanger lacking an upper strap or comprising upper strap having a length that is less than a length which, when the hanger is installed on the surfboard and the end seat is connected to a first end of the surfboard, extends from the body ring past a second end of the surfboard which opposes the first end. In this alternative embodiment, the upper portion of the body ring and optional upper strap are optionally facing away from the viewer and towards the supportive structure and the lower portion of the body ring is facing towards the viewer (e.g. where the viewer sees the hanger as a right side up "V" or "Y").

An upper strap useful in the present invention can be made of any material.

End Seat

In one embodiment, a hanger of the present invention comprises an end seat. The end seat can be any device that attaches to a surfboard at an end of the surfboard. Optionally, the end of the surfboard to which the end seat attaches is the nose or the tail.

Optionally, the end seat is a tail seat or a nose seat. A tail seat is any end seat that attaches to a location on the surfboard that is closer in proximity to the tail than the midpoint between the tail and the nose. A nose seat is any end seat that attaches to a location on the surfboard that is closer in proximity to the nose than the midpoint between the tail and the nose. Optionally, the end seat is an absolute end seat, i.e. an end seat that contacts the nose or tail of the surfboard (e.g. a pocket that holds the tail or nose). Alternatively, the end seat is not an absolute end seat (an 'offset end seat'), i.e. an end seat that does not contact the nose or tail of the surfboard (e.g. a plug seat or a ring that surround the surfboard near the nose or tail but does not contact the nose or tail).

Optionally, the end seat is configured to impart a vertical normal force to the surfboard to bear at least a portion of the weight of the surfboard (e.g. a hook or a pocket). Additionally or alternatively, the end seat is configured to impart a vertical frictional force to the surfboard (e.g. a clamp with laterally opposing members or a tightened ring or lasso).

Figure 5:
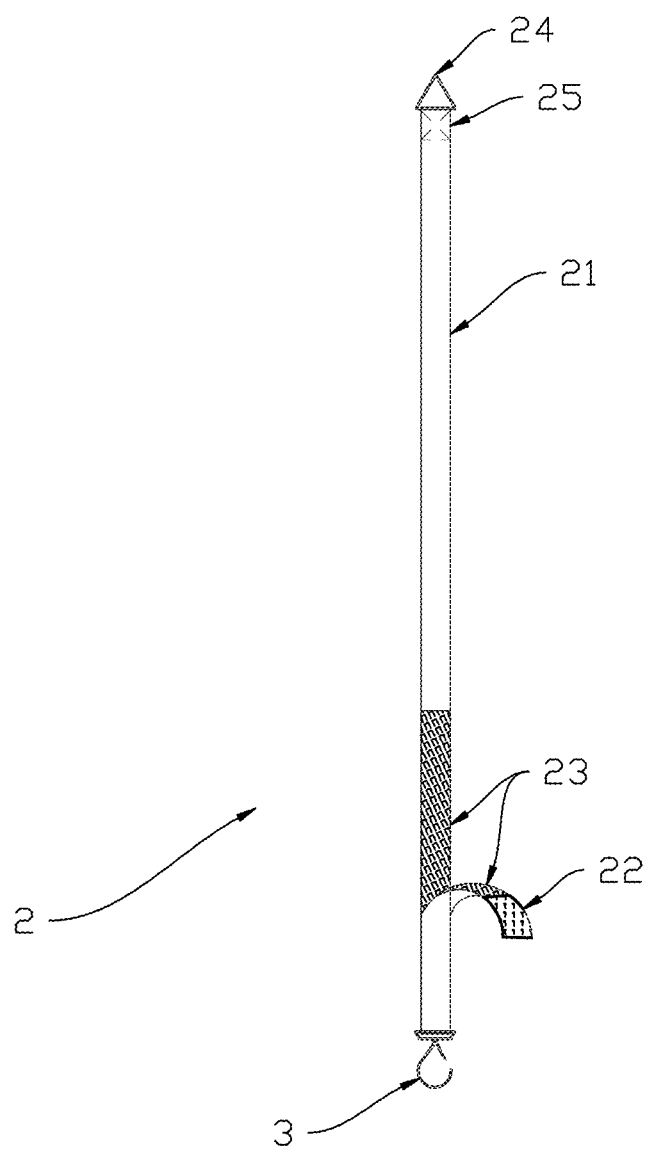
FIG. 5 depicts a lower strap and a tail seat useful in a hanger of the invention.
Figure 6A:
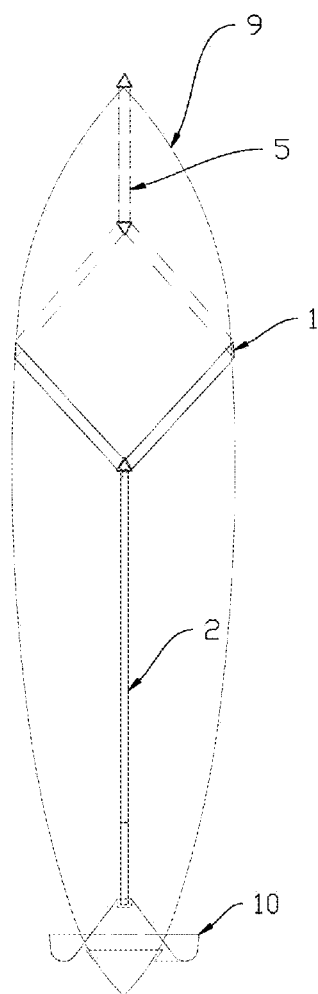
FIGS. 6A-6C depict a hanger of the invention installed on a surfboard.
Figure 6B:
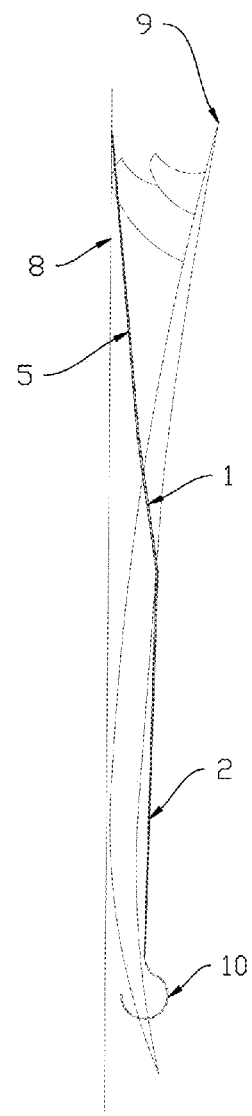
Figure 6C:
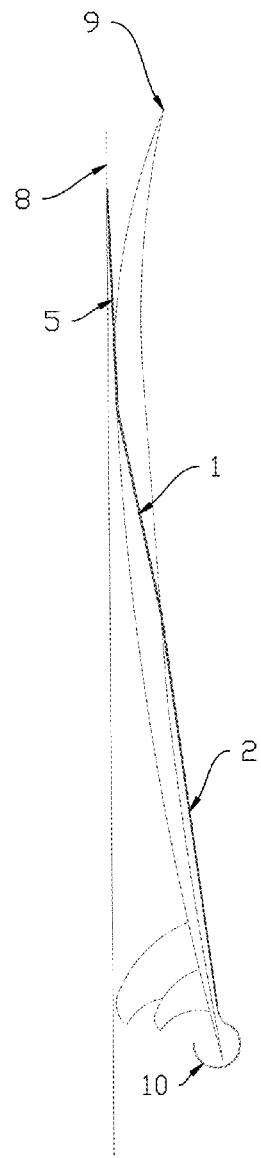
Figure 7:
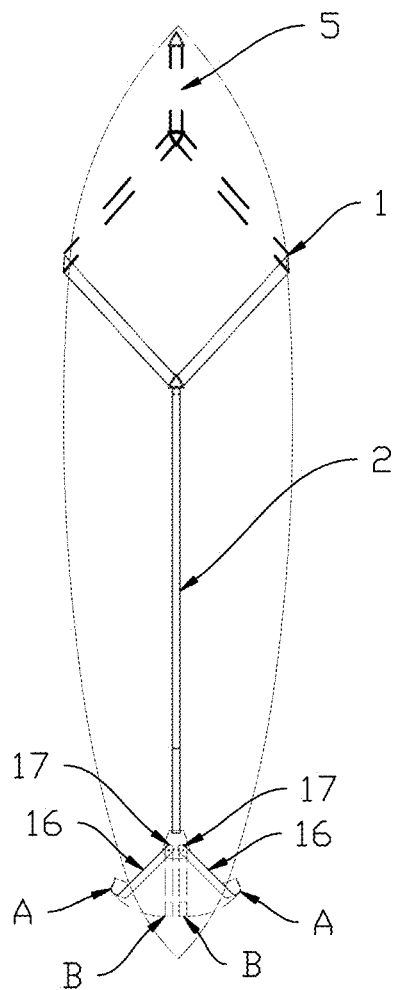
FIG. 7 depicts a hanger of the invention installed on a surfboard.
Figure 8:
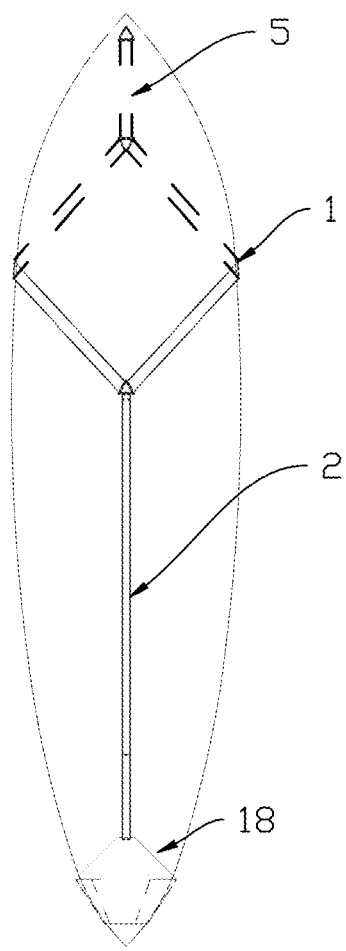
FIG. 8 depicts a hanger of the invention installed on a surfboard.

Optionally, the end seat comprises a pocket (e.g. pocket 18 in FIG. 8), a ring or an aperture (e.g. end seat 10 in FIG. 6A or pocket 18 in FIG. 8), a hook (e.g. end seat 3 in FIG. 5, hooks 16 in FIG. 7, end seat 10 in FIG. 6C), or a clamp (e.g. a spring clamp or a screw clamp).

Optionally, the end seat is configured for dual use on a plurality of alternative sportsboard end shapes ('dual use end seat'), e.g. by providing a first seating component configured for a flat end or wide end and a second seating component figured for a narrow or tapered end. For example, the dual use end seat can comprise a hook with an aperture, e.g. hook 10 depicted in FIGS. 6A-C. In this example, the hook can be configured for flat or wide ends (e.g. a square tail or squash tail as in FIG. 6C) and the aperture can be configured to accept narrow or tapered ends (e.g. a surf board nose, as in FIGS. 6A and 6B). As another example, the dual use end seat can comprise a plurality of adjustable (e.g. pivoting) hooks that can accommodate different end shapes (e.g. adjustable hooks 16 in FIG. 7, which are shown to pivot on pivot joints 17 to assume alternative positions A and B to accommodate, e.g. a tapered end or flat end, respectively).

Optionally, the end seat is a tail seat. Optionally, the tail seat is a tail pocket (e.g. a pocket configured to hold the tail as in pocket 18 shown in FIG. 8), a tail ring (e.g. a device having an aperture configured to accept a tapered tail as in hook 10 with aperture depicted in FIG. 6A), a tail hook (e.g. a hook configured to engage a tail, as in hook 10 in FIG. 6C or hooks 16 depicted in FIG. 7) a plug seat (e.g. a hook configured to engaged a surfboard plug or leash rope as in end seat 3 depicted in FIG. 5) and FIG. 2A), or a fin seat (e.g. a hook or loop configured to engage a fin). Optionally, the tail seat comprises a plug seat such as a hook (e.g. end seat 3 depicted in FIG. 5 and FIG. 2A).

Figure 10:
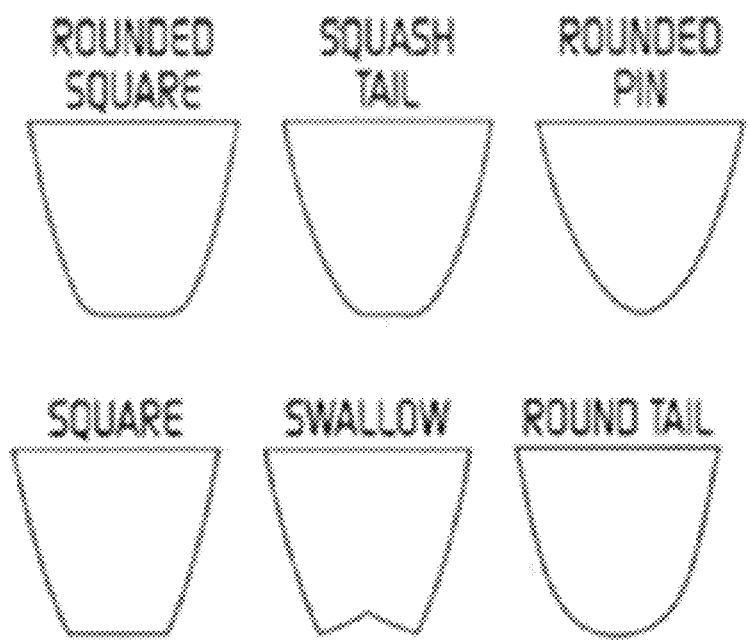
FIG. 10 depicts optional tails for which a tail seat can be configured.

Optionally, the end seat is a tail seat configured for any of the surfboard ends depicted in FIG. 10.

The skilled artisan will appreciate that any other end seat is useful in the present invention and can be configured for any board's shape and dimensions.

Boards

A hanger of the present invention can be used to hang any device ('board').

Although embodiments of the invention are taught herein as being configured for a surfboard, the invention also contemplates for each of said embodiments, an alternative embodiment in which the hanger is configured for a board other than a surfboard.

Examples of useful boards for which a hanger of the invention can be configured include a surfboard, a ski, a skateboard, a snowboard, a boat (e.g. a canoe), and a wakeboard.

In one embodiment, a hanger of the invention is configured for a surfboard. Optionally, the surfboard has a length of about 5 feet to about 15 feet. Optionally, the surfboard has a width of about 1.5 feet to about 4 feet. Optionally, the thickness of the surfboard is about 1 inch to about 5 inches. Optionally, the surfboard is a long board, a short board, a fun board, or a stand up paddle board ('SUP').

Optionally, the surfboard is a long board. Optionally the length of the long board is from about 8 feet to about 15 feet. Optionally, the width of the long board is from about 1.3 feet to about 4 feet. Optionally, the thickness of the long board is from about 0.1 feet to about 0.5 feet.

Optionally, the surfboard is a fun board. Optionally the length of the fun board is from about 3.5 feet to about 8 feet. Optionally, the width of the fun board is from about 1.3 feet to about 2 feet. Optionally, the thickness of the fun board is from about 0.05 feet to about 0.3 feet.

Optionally, the surfboard is a short board. Optionally the length of the short board is from about 3.5 feet to about 7 feet. Optionally, the width of the short board is from about 1.3 feet to about 2 feet. Optionally, the thickness of the short board is from about 0.05 feet to about 0.3 feet.

Optionally, the surfboard is a stand-up-paddleboard ('SUP'). Optionally the length of the SUP is from about 9 feet to about 15 feet. Optionally, the width of the SUP is from about 2 feet to about 4 feet. Optionally, the thickness of the SUP is from about 0.2 feet to about 0.5 feet.

Optionally, the total length of the hanger (measured in a straight line from end seat to mount) is at least half the length of any surfboard length taught herein. Optionally, the total length of the hanger is less than the length any surfboard length taught herein or not more than 20% greater than the length of any surfboard length taught herein.

Optionally, the circumference of the body ring is at least the circumference of any surfboard taught herein (wherein circumference equals about 2 times the width plus 2 times the thickness of the surfboard). Optionally, the circumference of the body ring is no more than about 2 times or no more than about 1.5 times the circumference of the surfboard.

Assembly

One embodiment of the invention provides an assembly of a hanger according to the invention and a surfboard.

Optionally, the hanger comprises a body ring and an end seat, wherein the body ring surrounds the body of the surfboard and the end seat is coupled to an end of the surfboard. Optionally, the hanger comprises a mount assembly is mounted to a supporting structure such as a wall.

Methods

A hanger of the present invention can be used, e.g. to hang a surfboard.

In one embodiment, the invention also provides a method of hanging a surfboard comprising:
 a. providing a hanger of the invention;
 b. providing a surfboard;
 c. inserting the body of the surfboard through the body ring of the hanger;
 d. coupling the end seat to an end of the surfboard; and
 e. mounting the hanger to a supportive structure (e.g. a wall) using the mount.

Optionally, the method further comprises a step comprising of applying longitudinal tension to the lower strap, thereby inducing the body ring to apply lateral force to the surfboard, wherein said step follows the step of inserting the body of the surfboard through the body ring.

EXAMPLES

Example 1 Hanger

FIG. 1 depicts an example hanger of the invention.

The hanger comprises a body ring 1, a lower strap 2, a tail seat 3, a mount 4, and an upper strap 5. One side of the body ring 1 is connected to mount 4 through upper strap 5 and the opposing side of body ring 1 is connected to the tail seat 3 through lower strap 2.

Figure 2B:
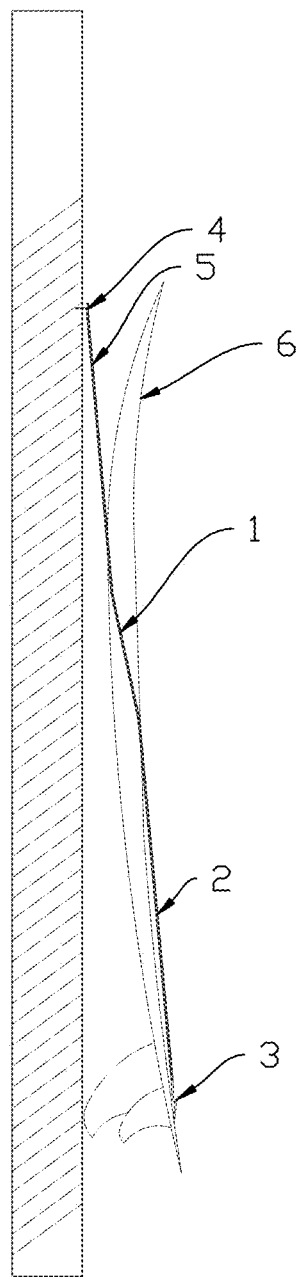
Figure 2C:
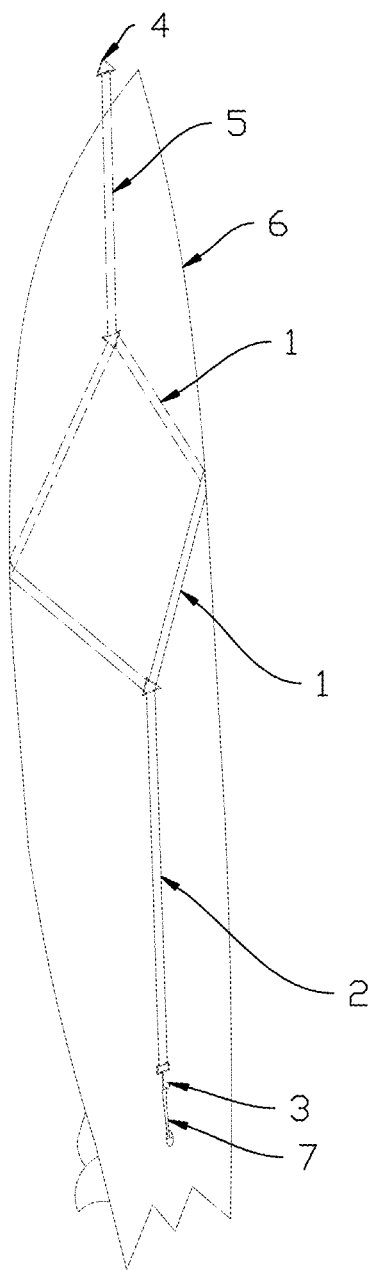
Figure 3:
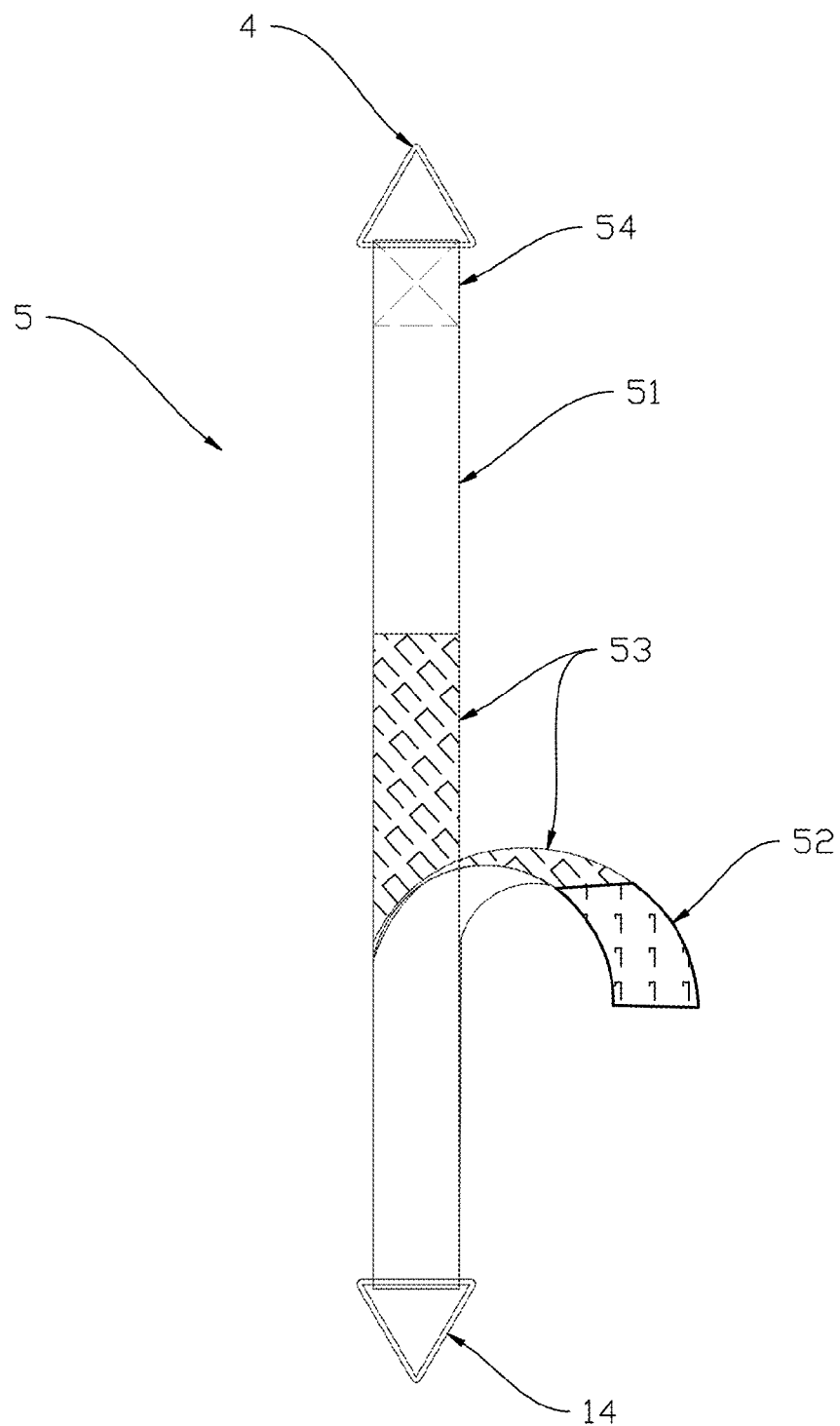
FIG. 3 depicts an upper strap and mount useful in a hanger of the invention.
Figure 4:
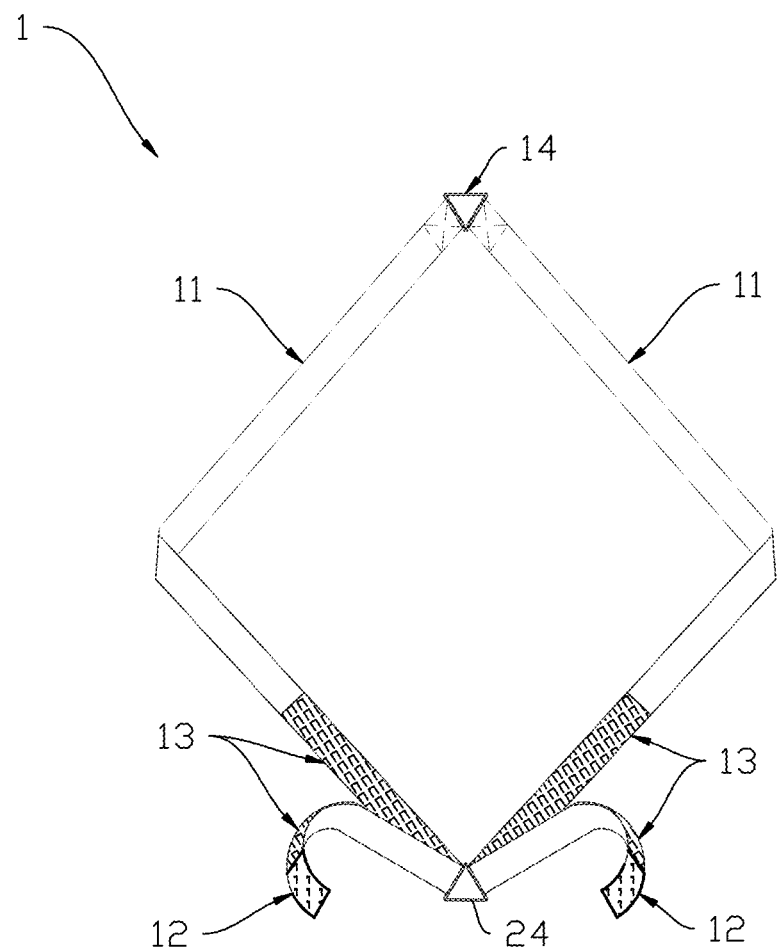
FIG. 4 depicts a body ring useful in a hanger of the invention.

As depicted, the tail seat 3 (and lower strap 2) and the mount 4 (and upper strap 5) are connected to opposing portions of the body ring 1. In this configuration, when the hanger is installed on a surfboard and mounted to a wall, as depicted in FIG. 2, the weight of the surfboard on tail seat 3 imparts tension to lower strap 2 and upper strap 5, and which relays the vertical force to opposing sides of body ring 1 and causes the body ring 1 to apply lateral force to ('squeeze') the surfboard. This lateral force imparts friction to the surfboard body through the body ring, enabling the body ring 1 to support a portion of the vertical load of the surfboard. As depicted, given enough initial slack in the body ring 1, the tension on opposing side of the body ring induces a "V" shape in the upper and/or lower sides of the body ring 1, and a "Y" shape in combination the lower strap and/or upper strap. Also as depicted, the "V" and "Y" shapes are symmetrically positioned about the center line of the surfboard. Further, in this example, the amount of lateral squeeze and hence, friction, imparted to the surfboard is dependent upon the weight of the surfboard which dictates the amount of tension applied to the upper and lower straps which is relayed to the body ring 1. This features is especially useful, e.g. to reduce the amount of force applied by an end seat to the surfboard, thereby reducing damage such as compression marks ("dings") or cracks to the delicate surfboard end.

The body ring 1 is constructed from two straps 11 joined at one end to a triangular ring 14 by a sewn lap joint 15 and at another end to triangular ring 24 by a lap joint formed from a hook and loop mechanism comprising a section of hook 12 and a section of loop 13. Lap joint 15 is by formed by inserting the end of the strap 11 through the triangular ring 14, folding the end back on the strap 11, and sewing the end of the strap 11 to a second portion of the strap 11. Each of the straps 11 are joined to triangular ring 24 using a lap joint formed by inserting an end of the strap comprising a section of hook 12, and folding the section of hook 12 back onto the section of loop 13. The length of each straps 11 is, for example, about 28 inches, including, for example about 2 inches of hook section 12 and about 8 inches of loop section 13. These examplary lengths provide each strap with a working length of about 20 inches to about 26 inches and a total working body ring perimeter of about 40 inches to about 52 inches.

The lower strap 2 comprises a length of strap 21 connected at one end to a triangular ring 24 by a sewn lap joint 25 and at another end to tail seat 3 by a lap joint formed from a hook and loop mechanism comprising a section of hook 22 and a section of loop 23. Lap joint 25 is by formed by inserting the end of the strap 21 through the triangular ring 24, folding the end back on the strap 21, and sewing the end of the strap 21 to a second portion of the strap 21. The strap 21 is joined to tail seat 3 using a lap joint formed by inserting an end of the strap comprising a section of hook 22, and folding the section of hook 22 back onto the section of loop 23. The length strap 21 is, for example, about 34¾ inches, including, for example about 2 inches of hook section 22 and about 10 inches of loop section 23. These examplary lengths provide each strap with a working length of about 26 ¾ inches to about 34 ¾.

The upper strap 5 comprises a length of strap 51 connected at one end to a triangular ring or other mount 4 by a sewn lap joint 54 and at another end to triangular ring 14 by a lap joint formed from a hook and loop mechanism comprising a section of hook 52 and a section of loop 53. Lap joint 54 is by formed by inserting the end of the strap 51 through the mount 4, folding the end back on the strap 51, and sewing the end of the strap 51 to a second portion of the strap 51. The strap 51 is joined to triangular ring 14 using a lap joint formed by inserting an end of the strap 51 comprising a section of hook 52, and folding the section of hook 52 back onto the section of loop 53. The length of strap 51 is, for example, about 26 inches, including, for example about 2 inches of hook section 52 and about 10 inches of loop section 53. These examplary lengths provide each strap with a working length of about 18 inches to about 26 ¾.

The mount 4 is provided as a ring such as a triangular ring.

The tail seat 3 is a plug seat, e.g. a hook configured to hook on to a leash plug. The hook can be configured to hook onto the metal bar typically inside the leash plug, or the short cord that is typically girth hitched to the metal bar. In this example, the tail seat 3, provided as a hook, bears a substantial weight of the surfboard by exerting a vertical normal force.

The normal force exerted through the tail seat 3, in combination with the frictional force exerted through the body ring 1, provides vertical load bearing to support the weight of the surfboard when installed and mounted, e.g. hung from a projection extending from wall such as a nail, screw, or hook.

Example 2 Hanger

Figure 9:
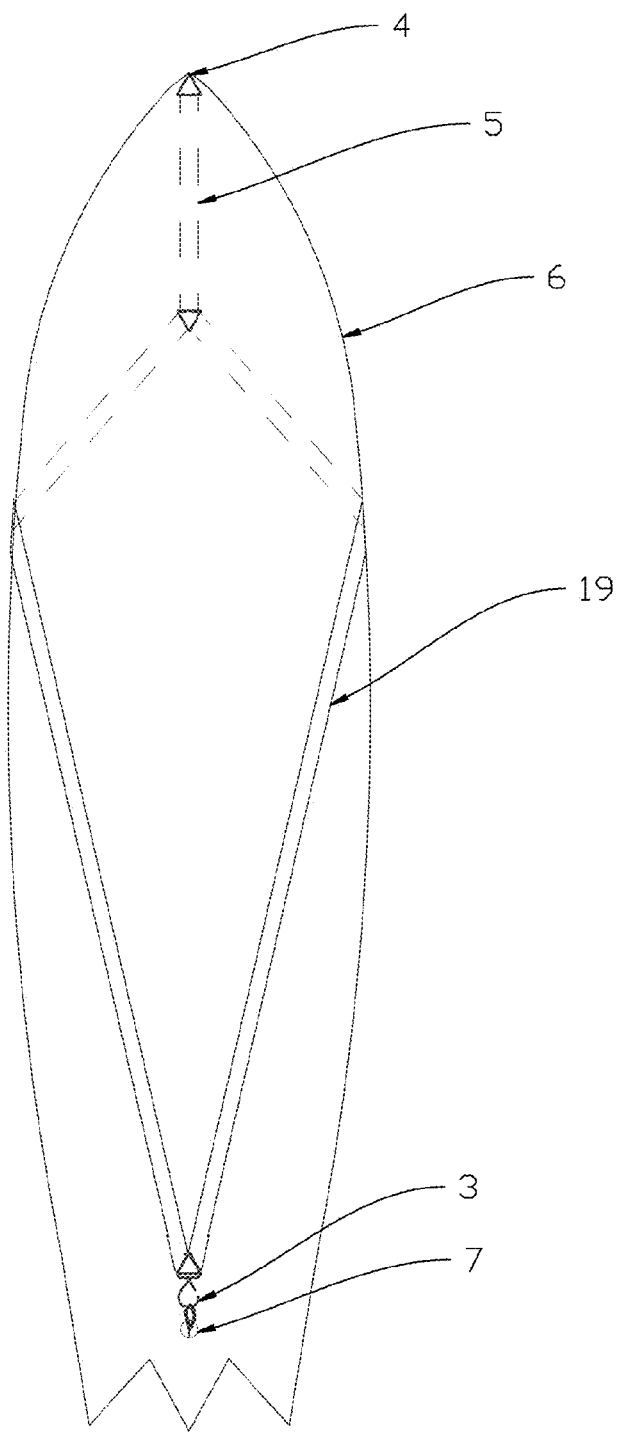
FIG. 9 depicts a hanger of the invention installed on a surfboard

FIG. 9 depicts an example hanger of the invention installed on a surfboard 6. The hanger comprises a body ring 19, a tail seat 3, a mount 4, and an upper strap 5. One side of the body ring 19 is connected to mount 4 through upper strap 5 and the opposing side of body ring 19 is directly connected to the tail seat 3.

As depicted, the tail seat 3 and the mount 4) are connected to opposing portions of the body ring 19. In this configuration, when the hanger is installed on a surfboard and mounted to a wall, the weight of the surfboard on tail seat 3 imparts tension to the body ring 19, causing the body ring 91 to apply lateral force to ('squeeze') the surfboard. This lateral force imparts friction to the surfboard body through the body ring, enabling the body ring 19 to support a portion of the vertical load of the surfboard. As depicted, the tension on opposing side of the body ring induces a "V" shape in the upper and/or lower sides of the body ring 19. Also as depicted, the "V" is symmetrically positioned about the center line of the surfboard. The use of a hanger without a lower strap can, e.g. provide a longer, more narrow "V" shape, which may be aesthetically preferred by some users. Further, in this example, the amount of lateral squeeze and hence, friction, imparted to the surfboard is dependent upon the weight of the surfboard which dictates the amount of tension applied to the body ring 19. This features is especially useful, e.g. to reduce the amount of force applied by an end seat to the surfboard, thereby reducing damage such as compression marks ("dings") or cracks to the delicate surfboard end.

Example 3 Hanger

Figure 11:
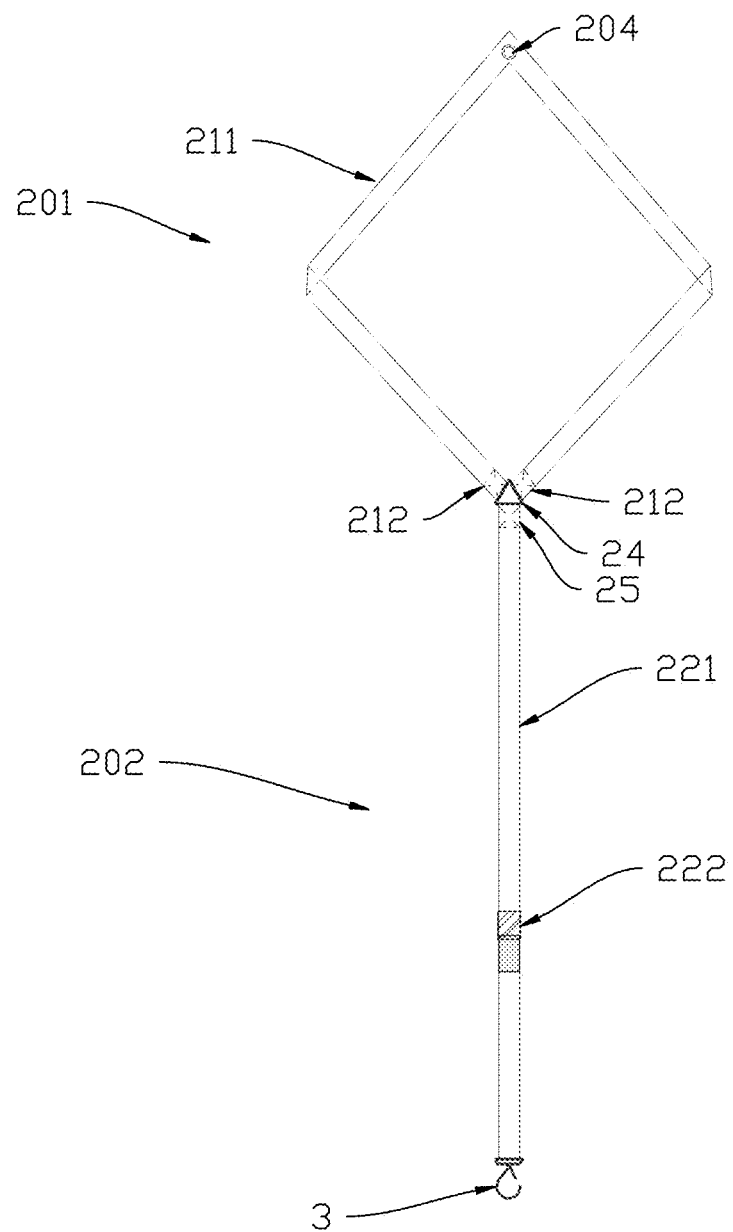
FIG. 11 depicts a hanger of the invention.

FIG. 11 depicts an example hanger of the invention. The hanger is similar to that detailed in Example 1 except that it lacks an upper strap.

The hanger comprises a body ring 201, a lower strap 202, a tail seat 3, and a mount 204. One side of the body ring 201 is directly connected to mount 204 which is a grommet in the body ring 201 and the opposing side of body ring 201 is connected to the tail seat 3 through lower strap 202. As an alternative to a direct connection of the body ring 201 to the mount 204, the hanger can comprises a short upper strap that does not extend past the nose of a surfboard when installed on the surfboard such that the mount is hidden behind the surfboard when mounted to a supportive structure such as a wall. As yet another alternative, the hanger can comprise a removable upper strap (i.e. an upper strap is releasably connected to the body ring) having a mount at one end and a connection mechanism for connecting to the body ring (e.g. via mount 204) such that the user can decide whether to install the hanger with the upper strap.

Figure 12A:
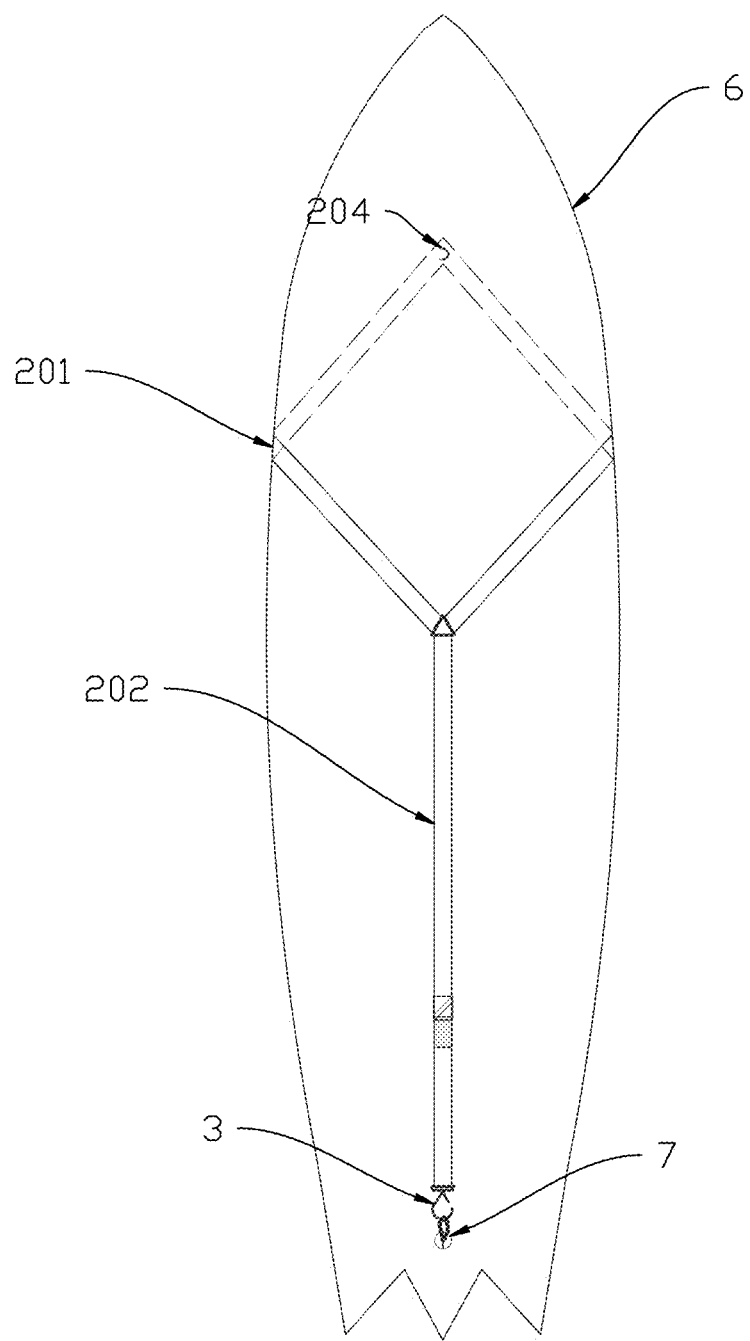
FIGS. 12A-12C depict a hanger of the invention installed on a surfboard in a front view, side view, and perspective view, respectively.
Figure 12B:
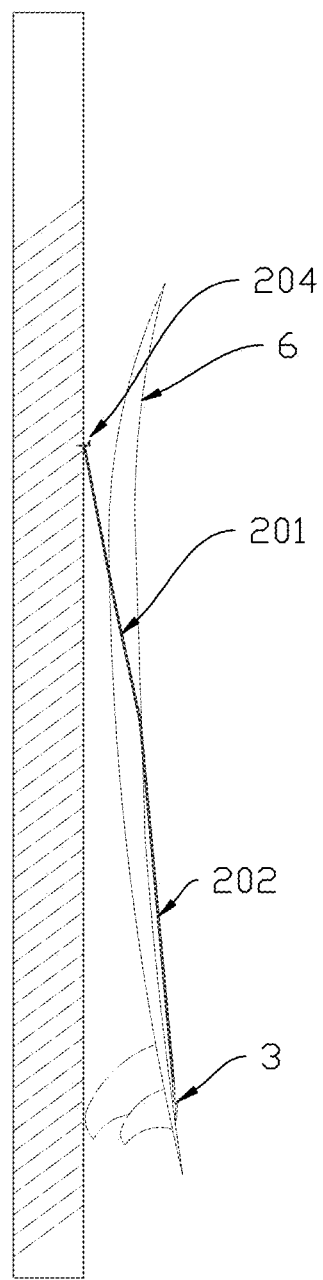
Figure 12C:
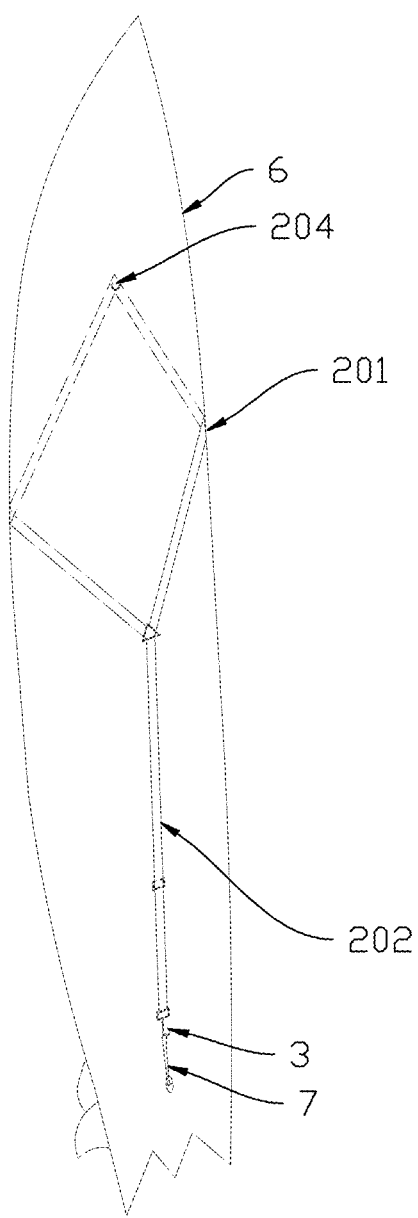
Figure 13:
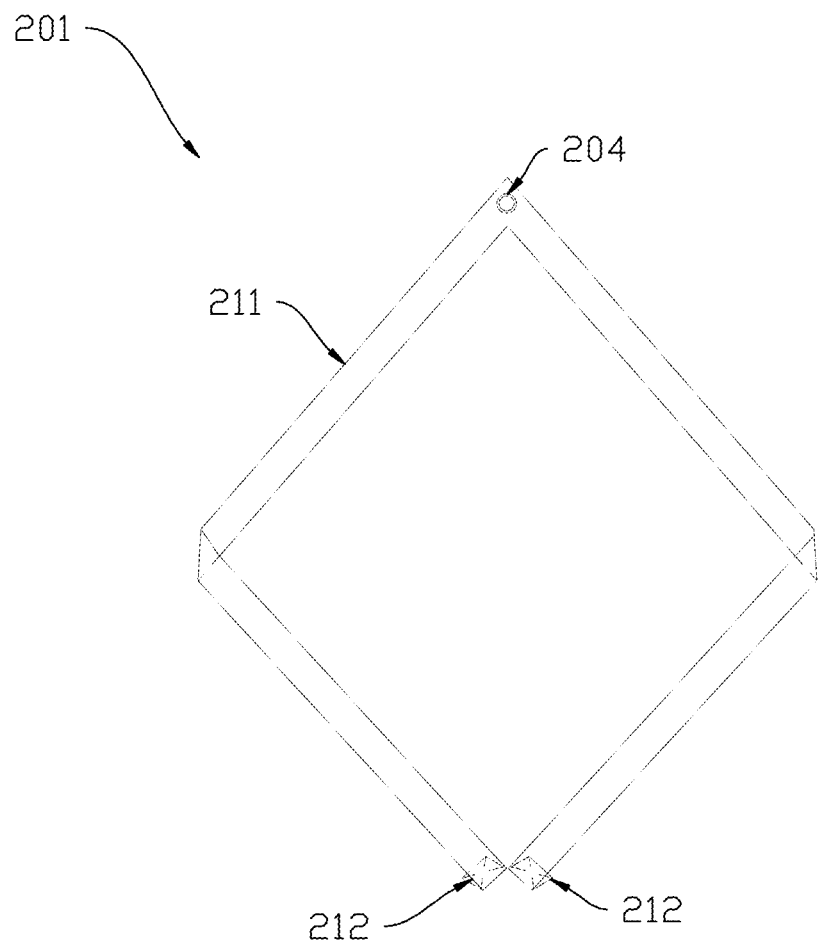
FIG. 13 depicts a body ring useful in a hanger of the invention.
Figure 14:
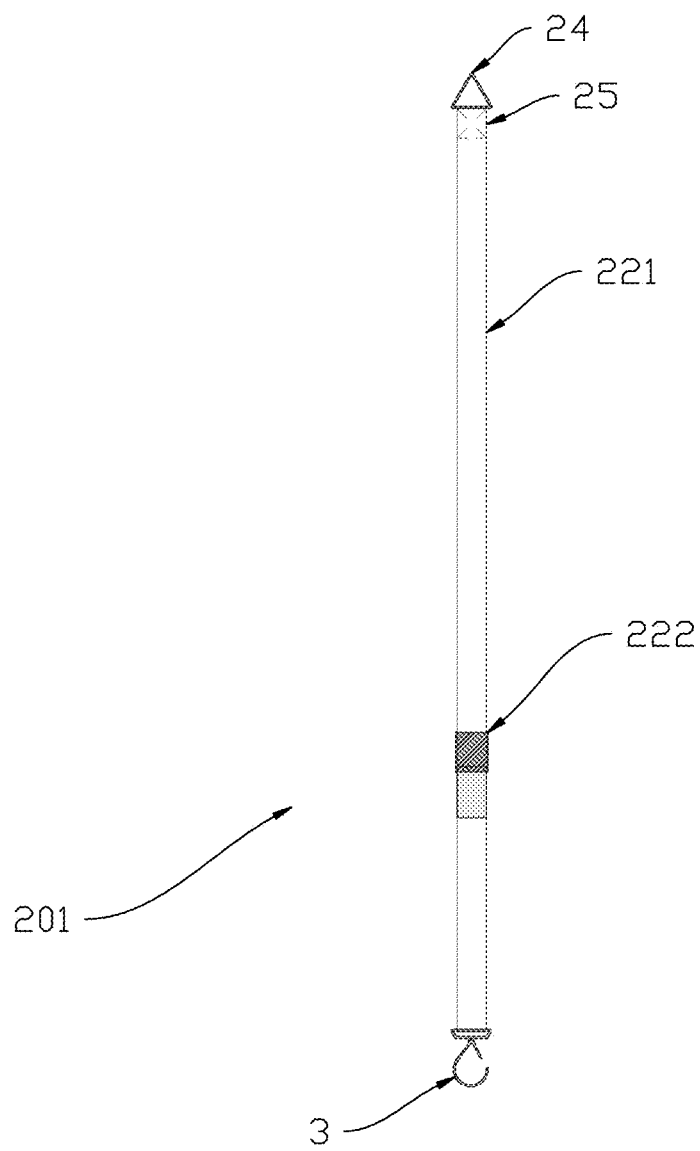
FIG. 14 depicts a lower strap and a tail seat useful in a hanger of the invention.

As depicted, the tail seat 3 (and lower strap 202) and the mount 204 are connected to opposing portions of the body ring 201. In this configuration, when the hanger is installed on a surfboard and mounted to a wall, as depicted in FIGS. 12A-12C, the weight of the surfboard on tail seat 3 imparts tension to body ring 201, causing the body ring 201 to apply lateral force to ('squeeze') the surfboard. This lateral force imparts friction to the surfboard body through the body ring, enabling the body ring 201 to support a portion of the vertical load of the surfboard. As depicted, given enough initial slack in the body ring 201, the tension on opposing side of the body ring induces "Y" shape in combination the lower strap. Also as depicted, the "Y" shapes is symmetrically positioned about the center line of the surfboard. Further, in this example, the amount of lateral squeeze and hence, friction, imparted to the surfboard is dependent upon the weight of the surfboard which dictates the amount of tension which is relayed to the body ring 201. This features is especially useful, e.g. to reduce the amount of force applied by an end seat to the surfboard, thereby reducing damage such as compression marks ("dings") or cracks to the delicate surfboard end.

The body ring 201 is, e.g. constructed from a strap 211 having its ends joined, e.g. to a triangular ring 24 by a sewn lap joints 212. The circumference (i.e. total length) of the body ring, for example, about 48 inches but can alternatively be any length, e.g. about 40 inches to about 52 inches.

The lower strap 202 comprises a length of strap 221 connected to the body ring, e.g. to ring 24 by a sewn lap joint 25, and connected to tail seat 3, e.g. by looping an end of the strap 221 and connecting the end of the strap back to an intermediate portion of the strap via an adjustable buckle 222 (e.g. a cam buckle or a bar slide buckle) or any other length adjustment mechanism. Lap joint 25 is by formed by inserting the end of the strap 221 through the triangular ring 24, folding the end back on the strap 221, and sewing the end of the strap 221 to a second portion of the strap 221. The length strap 221 is, for example, about 36 inches in its fully extended configuration and about 18 inches in its fully shortened configuration. Using a hook of about 2 inches as the tail seat optionally provides a total length from the board connection point to the body ring about 20 inches to about 38 inches.

The mount 204 is provided, e.g. as a grommet in the strap 211 of body ring 201 or any ring connected to the body ring 201.

The tail seat 3 can be any tail seat such as a plug seat, e.g. a hook configured to hook on to a leash plug. The hook can be configured to hook onto the metal bar typically inside the leash plug, or the short cord that is typically girth hitched to a metal bar of a leash plug. In this example, the tail seat 3, provided as a hook, bears a substantial weight of the surfboard by exerting a vertical normal force.

The normal force exerted through the tail seat 3, in combination with the frictional force exerted through the body ring 201, provides vertical load bearing to support the weight of the surfboard when installed and mounted, e.g. hung from a projection extending from wall such as a nail, screw, or hook.

The citations provided herein are hereby incorporated by reference for the cited subject matter.

The invention claimed is:
1. A surfboard hanger comprising:
  a. an end seat configured to support an end of a sports board, wherein the sports board is a surfboard and wherein the end seat is configured for attachment to a leash rope of the surfboard or a leash plug of the surfboard;
  b. a ring (body ring) configured to surround and contact the body of the sports board; and c. a mount connected to the body ring, wherein the mount is configured for attaching the hanger to a supportive structure;

wherein, the mount and the end seat are connected to opposing portions of the body ring such that when installed on a sports board and mounted to a supportive structure, the weight of the sports board on the body ring causes the body ring to squeeze the sports board, thereby applying a lateral force to the sports board.

2. The hanger of claim 1, wherein the hanger comprises a first strap (lower strap) connected at one end to the end seat and at another end to the body ring and wherein the length of the lower strap is adjustable.

3. The hanger of claim 2, wherein the adjustability of the lower strap is provided by a hook and loop mechanism or a buckle.

4. The hanger of claim 1, wherein when the hanger is mounted to the supportive structure, the amount of lateral force applied to the surfboard by the body ring is dependent upon the weight of the surfboard.

5. The hanger of claim 4, wherein when the hanger is mounted to the supportive structure, the weight of the surfboard is at least partially supported by friction imparted on the surfboard by the body ring.

6. The hanger of claim 1, wherein the end seat comprises a hook.

7. The hanger of claim 1, wherein
the hangar comprises at least one of a first strap (lower strap) connected at one end to the end seat and at another end to the body ring and a second strap (upper strap) connected at one end to the mount and at another end to the body ring; and
when the hanger is installed on a surfboard and mounted to a supportive structure, the body ring forms a "Y" shape in combination with at least one of the upper strap and the lower strap.

8. The hanger of claim 7, wherein the "Y" shape is symmetrically positioned over the center line of the surfboard.

9. The hanger of claim 1, wherein:
a. the mount is directly attached to the body ring; or
b. the hanger comprises a second strap providing connection of the mount to the body ring, wherein the length of the second strap is less than a length which, when the hanger is installed on the surfboard and the end seat is connected to a first end of the surfboard, extends from the body ring past a second end of the surfboard which opposes the first end.

10. The hanger of claim 1, further comprising a first strap connected at one end to the end seat and at another end to the body ring.

11. A sports board hanger installed on a sports board, the hanger comprising:
a. an end seat attached to an end of the sports board;
b. a ring (body ring) surrounding and contacting the body of the sports board; and
c. a mount connected to the body ring, wherein the mount is configured for attaching the hanger to a supportive structure;

wherein the mount and the end seat are connected to opposing portions of the body ring such that when the hanger is mounted to the supportive structure, the weight of the sports board on the body ring causes the body ring to squeeze the sports board, thereby applying a lateral force to the sports board.

12. The hanger of claim 11, further comprising a first strap connected at one end to the end seat and at another end to the body ring.

13. The hanger of claim 12, wherein the length of the first strap is adjustable.

14. The hanger of claim 13, wherein the adjustability of the first strap is provided by a hook and loop mechanism or a buckle.

15. The hanger of claim 12, wherein the end seat is a tail seat attached to a tail of the sports board.

16. The hanger of claim 15, wherein the tail seat comprises a tail pocket, a tail loop, a fin seat, a plug seat, or a plug seat comprising a hook.

17. The hanger of claim 11, wherein the end seat is a tail seat attached to a tail of the sports board.

18. The hanger of claim 17, wherein the tail seat comprises a tail pocket, a tail loop, a fin seat, a plug seat, or a plug seat comprising a hook.

19. The hanger of claim 11, wherein when the hanger is mounted to the supportive structure, the weight of the sports board is at least partially supported by friction imparted on the sports board by the body ring.

20. The hanger of claim 19, wherein the sports board is a surf board.

21. A sports board hanger comprising:
a. an end seat configured to support an end of a sports board,
b. a ring (body ring) configured to surround and contact the body of the sports board; and
c. a mount connected to the body ring, wherein the mount is configured for attaching the hanger to a supportive structure, wherein the mount comprises a rigid hook, a rigid ring, or an eyelet in a strap;

wherein, the mount and the end seat are connected to opposing portions of the body ring; and
wherein when installed on a sports board and mounted to a supportive structure, the weight of the sports board on the body ring causes the body ring to squeeze the sports board, thereby applying a lateral force to the sports board.

22. The sports board hanger of claim 21 wherein the supportive structure is a nail or a screw.

23. The sports board hanger of claim 21, wherein the mount comprises the eyelet in a strap, and wherein the eyelet is a grommet made of plastic, rubber, or metal.

* * * * *